Feb. 19, 1935.  A. R. WOOD  1,991,972
EYELET SEWING MACHINE
Filed April 13, 1933  5 Sheets-Sheet 2

Inventor
Alfred R. Wood

Witness:
John H. Cave

By Henry J Miller
Attorney

Feb. 19, 1935. A. R. WOOD 1,991,972
EYELET SEWING MACHINE
Filed April 13, 1933 5 Sheets—Sheet 3
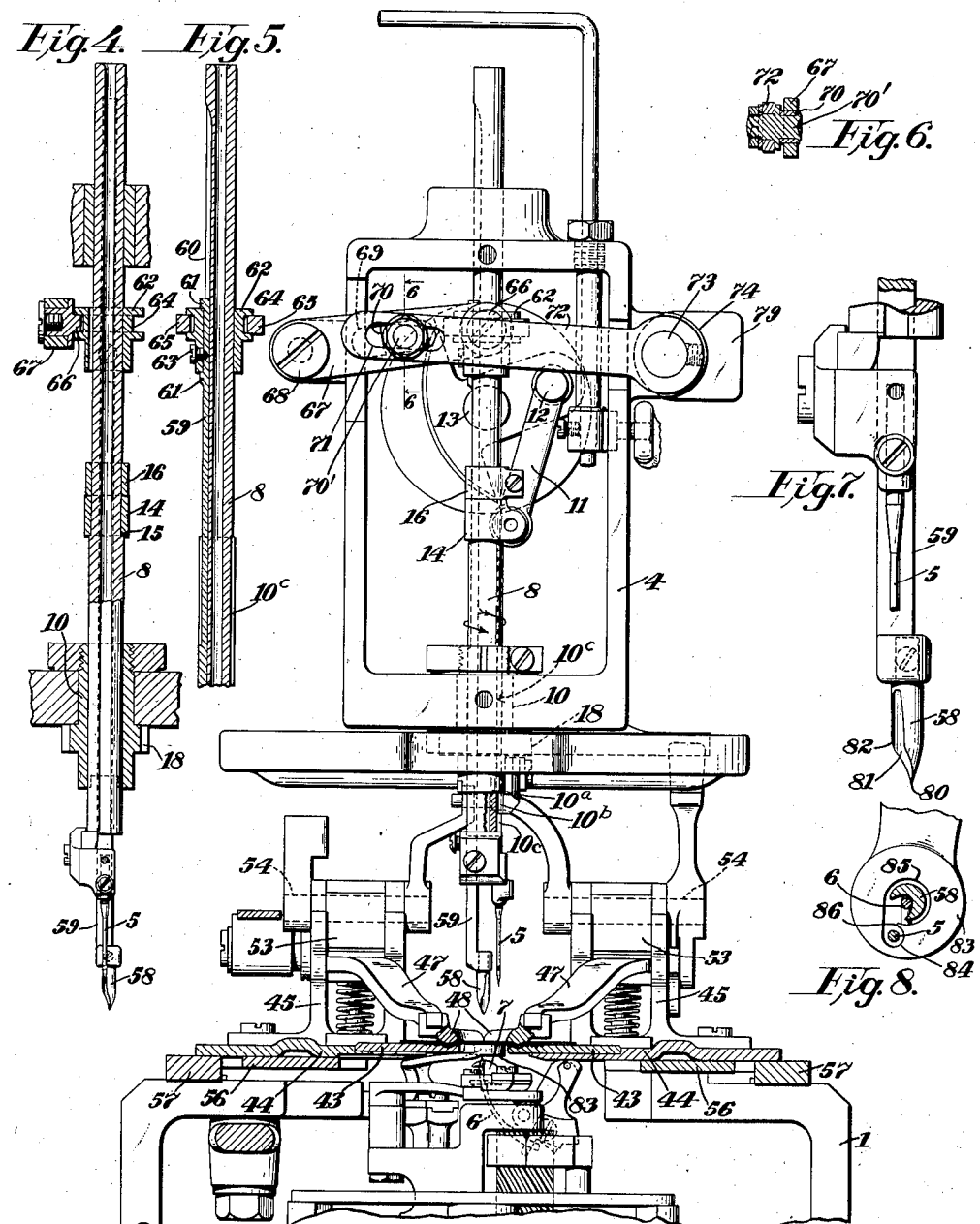
Inventor
Alfred R. Wood
By Henry J. Miller
Attorney
Witness:
John H. Cave Feb. 19, 1935.  A. R. WOOD  1,991,972
EYELET SEWING MACHINE
Filed April 13, 1933   5 Sheets-Sheet 4

Witness:
John H. Cave

Inventor
Alfred R. Wood
By Henry J. Miller
Attorney

Feb. 19, 1935. A. R. WOOD 1,991,972
EYELET SEWING MACHINE
Filed April 13, 1933 5 Sheets-Sheet 5
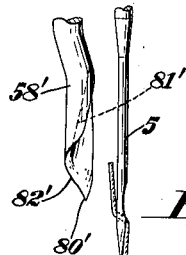
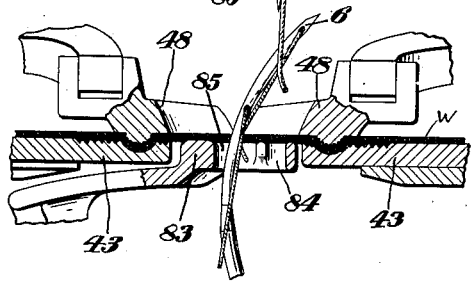
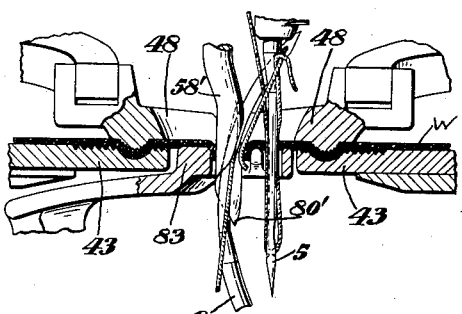
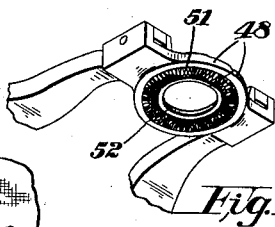
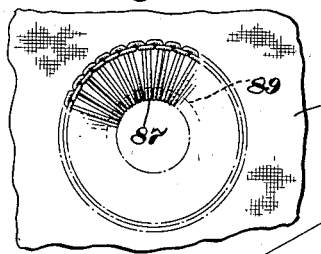
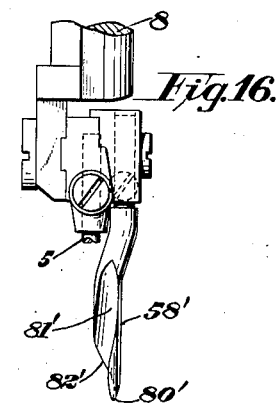
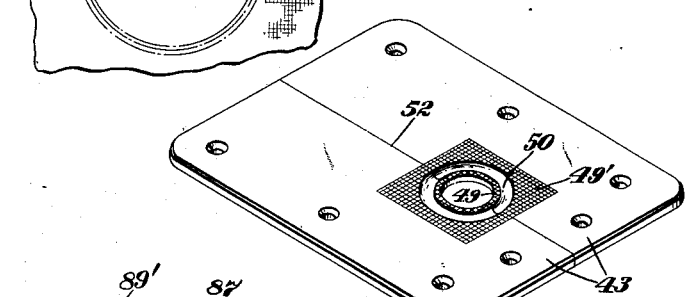
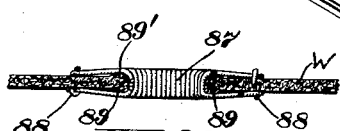
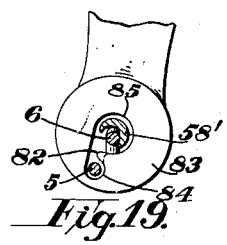
Inventor
Alfred R. Wood
Witness:
John N. Cave
By Henry J Miller
Attorney Patented Feb. 19, 1935

1,991,972

UNITED STATES PATENT OFFICE 1,991,972

EYELET SEWING MACHINE

Alfred R. Wood, Bridgeport, Conn., assignor to The Singer Manufacturing Company, Elizabeth, N. J., a corporation of New Jersey Application April 13, 1933, Serial No. 665,890

15 Claims. (Cl. 112—66)

This invention relates to sewing machines, more particularly to the type known as the buttonhole sewing type commonly used for overedging holes in material to form buttonholes, eyelets, and the like. To cut the hole in the material it has heretofore been the practice to provide a machine of this type with a buttonhole or eyelet cutting mechanism comprising a pair of cutter levers one of which carries a cutting element or punch and the other a cutting block or die; the mechanism operating to remove a small circular piece of material in cutting the hole in the work, before the sewing mechanism is started.

The present invention has for an object to simplify a machine of the type in question by eliminating the usual or preliminarily operating hole-cutting mechanism and by providing simple and efficient means for forming the hole in the material while the sewing operation is in progress.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
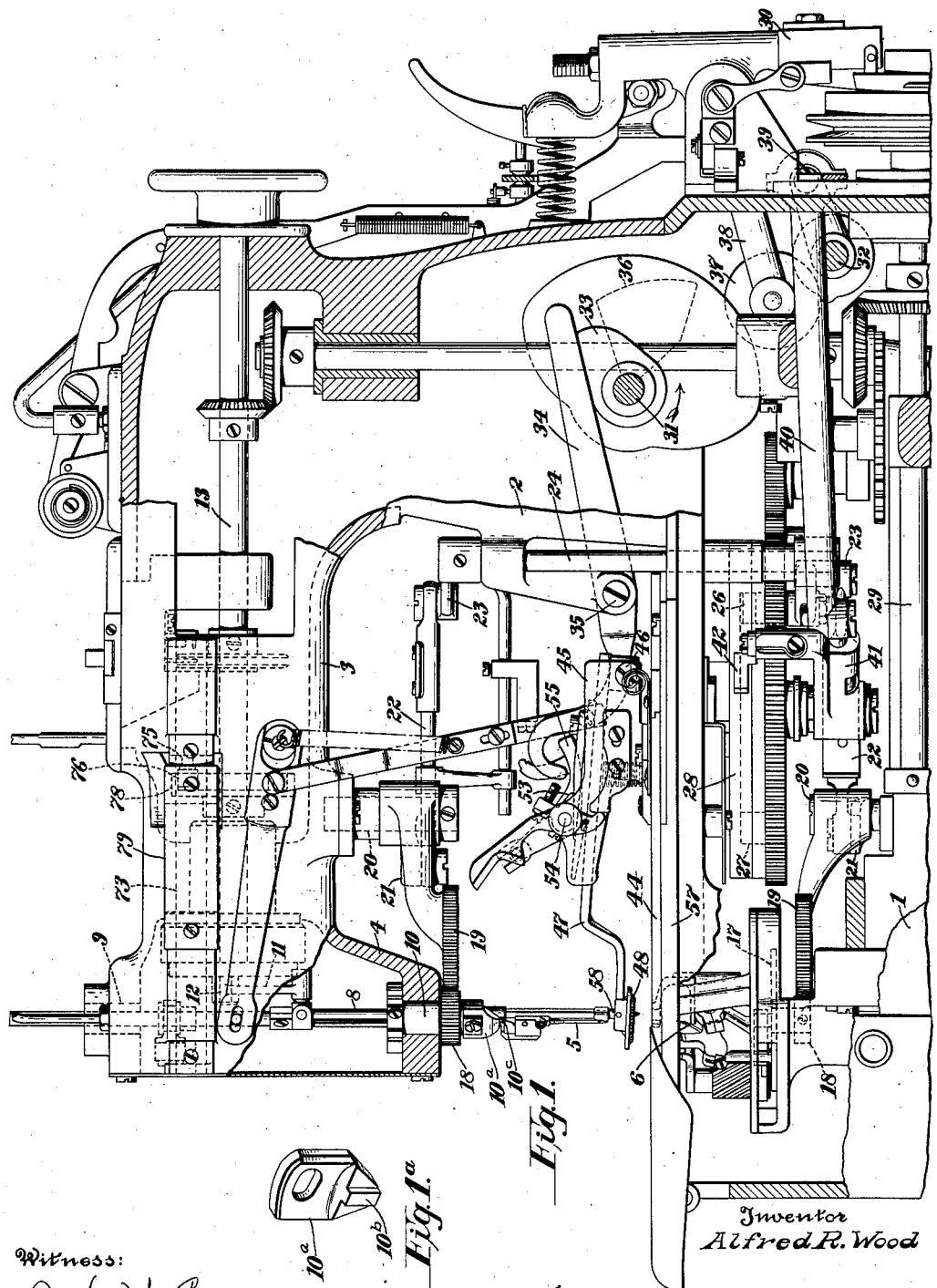
Figure 2:
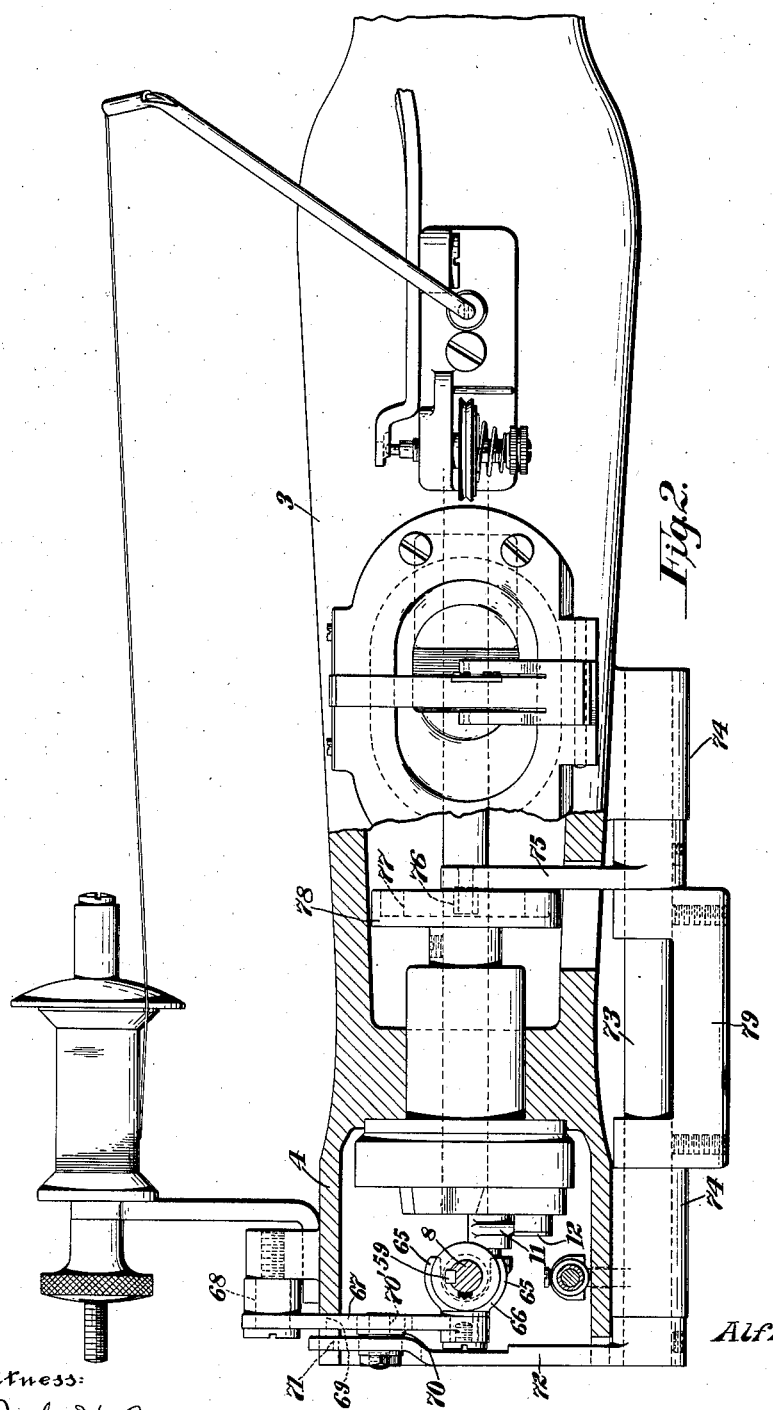
Figure 15:
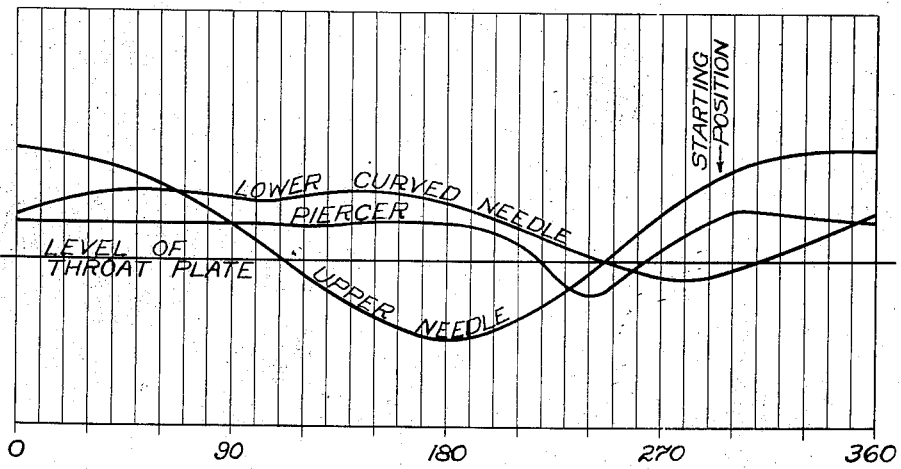

Fig. 1 of the drawings is a side elevation, partly in section, of an eyelet sewing machine embodying the invention. Fig. 1ª is a perspective view of an element of the needle-bar rotating mechanism. Fig. 2 is a top plan view of the bracket-arm of the machine. Fig. 3 is a fragmentary front end elevation of the machine. Figs. 4 and 5 are vertical sections through the reciprocatory needle-bar of the machine taken respectively in planes at 90° to one another. Fig. 6 is a section on the line 6—6, Fig. 3. Fig. 7 is an enlarged elevation of the upper needle and piercer elements. Fig. 8 is a plan view of the needle-throat member with the needles and piercer in section. Figs. 9, 10, 11 and 12 are a series of views illustrating in successive stages a stitch-forming cycle of operations of the machine. Figs. 13 and 14 are, respectively, perspective views of the upper work-clamping feet and lower work-clamping mats. Fig. 15 is a diagram of the motions of needles and piercer. Fig. 16 illustrates a modified form of piercer which is mounted directly on the needle-bar. Figs. 17 and 18 illustrate the modified form of piercer. Fig. 19 is a plan view of the needle-throat member with the needles and modified piercer in section, and Figs. 20 and 21 are, respectively, plan and sectional views of a piece of fabric with an eyelet worked therein by a machine embodying the invention.

The machine constituting a preferred embodiment of the invention is constructed with a frame formed with the usual hollow box-like bed 1 from which rises the standard 2 of the overhanging bracket-arm 3 terminating in the head 4.

The stitch-forming mechanism is preferably of the well-known type having an upper reciprocatory straight depth-stitch needle 5, a lower curved needle or overedge implement 6 and a lower looper 7, such as disclosed in the patent to Allen, No. 1,162,207, of Nov. 30, 1915. The upper needle 5 is fixed to the hollow reciprocatory and rotary needle-bar 8 which is journaled as usual in the upper bushing 9 and lower rotary bushing 10 and is reciprocated by the usual link-connection 11 with the crank 12 on the upper rotary shaft 13. The lower end of the link 11 is pivotally connected to a collar 14 loose on the needle-bar 8 and confined vertically on the needle-bar between the shoulder 15 and fixed collar 16. The rotary bushing 10 has screwed to its lower end the usual gib 10ª formed with a rib or spline 10ᵇ entering the groove 10ᶜ in the side of the needle-bar 8.

The lower curved needle 6 and looper 7 are mounted as usual on the rotary turret 17 and actuated in a manner well known.

The rotary needle-bar bushing 10 and the turret 17 are provided with the usual pinions 18 meshing with toothed sectors 19 which are preferably mounted upon separate but alined fulcra 20. These sectors have lateral arms 21 which are connected by adjustable links 22 to cranks 23 on a vertical shaft 24 to which is fixed an arm 25 carrying a cam follower roll 26 entering a cam-groove 27 in the usual feed-wheel 28. The mechanism just described slowly turns the stitch-forming instrumentalities about a vertical axis in the direction of the arrow, Fig. 3, during the sewing operation, to place the overedge stitches radially of the eyelet. This mechanism is substantially the same as that disclosed in the patents to Allen, No. 1,162,207, above referred to, and No. 1,346,102, of July 13, 1920.

The feed-wheel 28 is given a slow step-by-step movement during the sewing by means of the usual reduction gear connections with the main sewing shaft 29, the period of operation of which is controlled by the usual stop-motion device 30, all as disclosed in said Allen Patent No. 1,346,102.

Preferably, there are two cross-shafts 31, 32 journaled in the machine frame. Shaft 31 performs a single rotation prior to sewing and carries a cam 33 which acts upon the clamp-closing lever 34 fulcrumed at 35 upon the machine frame. Shaft 31 also carries a cam 36 which acts upon the follower roll 37 carried by an arm 38 to tilt the stop-motion lever 30 to running position. Shaft 32 performs a single rotation subsequent to sewing. It is formed with a crank 39 which acts through the link 40 to swing the arm 41 and pawl 42 and impart a rapid motion to the feed-wheel 28 in one sweep of the arm 41, after the sewing is completed, to restore the feed-wheel to its initial position. These cross-shafts 31, 32, together with their driving and controlling connections and the parts driven thereby, are well known, being constructed substantially in accordance with the disclosure of said Allen Patent No. 1,346,102.

The work-clamp preferably comprises the usual lower clamping mats 43 carried by the lower clamp-plates 44 which carry the fulcrum-blocks 45 to which are pivoted at 46 the upper clamp-arms 47 carrying the clamp-feet 48. The clamping mats 43 are formed within a roughened area 49' with a round sewing aperture 49 which is surrounded by the groove 50. The clamping feet 48 have a roughened circular rib 51 on their under faces which is complemental to the groove 50. It is of course understood that the clamping mats 43 and clamping feet 48 are divided along the median line 52 in the customary way. The clamp arms 47 are depressed to close the clamp-feet upon the work by means of the usual cams 53 on the connected rock-shaft sections 54 one of which carries a rearwardly projecting arm 55 underhanging the clamp-closing lever 34 previously referred to. The clamp-plates 44 are carried as usual by the cross-slide plate 56 and longitudinal slide-frame 57 which receive motion from the feed-wheel 28 during the sewing to shift the work in a circular path for the proper positioning of the stitches. The work-clamp and its connections with the feed-wheel are well known, being disclosed for example in the patent to Allen, No. 1,442,842, of Jan. 23, 1923.

The novelty in the present machine resides chiefly in the elimination of the usual eyelet or buttonhole cutter levers heretofore actuated by the shaft 31 and the substitution therefor of the reciprocatory work-piercer 58 which in the embodiment of the invention shown in Figs. 1 to 15, inclusive, is fixed to a piercer-bar 59 slidably mounted in a groove 60 in the side of the needle-bar 8. The piercer-bar 59, Fig. 5, is formed at its upper end with stops 61 which engage the opposite ends of a collar 62 freely surrounding the needle-bar 8 but fixed against rotation relative to the piercer-bar 59 by means of the screw 63. The collar 62 is peripherally grooved at 64, Fig. 4, to receive the spaced arms 65 of a fork 66, Fig. 2, pivotally carried by the arm 67 fulcrumed at 68 on the head 4. It will be observed in Figs. 4 and 5 that there is clearance between the arms 65 of the fork 66 and the bottom wall of the groove 64 to permit the fork 66 to move about the center of the fulcrum-screw 68 as it imparts a straight line vertical reciprocatory motion to the collar 62 and piercer-bar 59.

Figure 9:
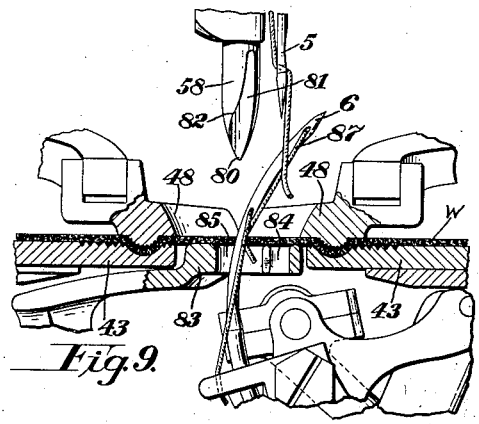
Figure 10:
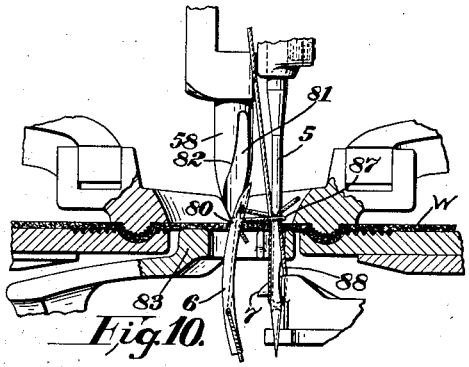
Figure 11:
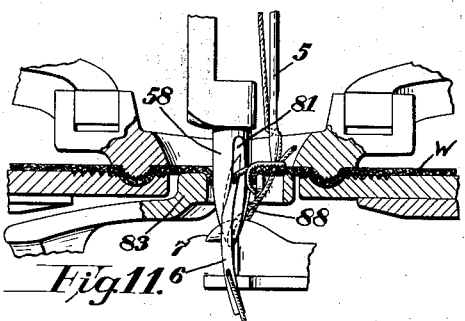

The lever 67 is formed with a slot 69 extending longitudinally thereof. The slot 69 is entered by the slide-block 70 on the pin 70', Fig. 6, which is adjustable longitudinally of the slot 71, Fig. 3, in the lever-arm 72 fixed to the rock-shaft 73 journaled in bearing lugs 74 on the bracket-arm 3. There is fixed to the rock-shaft 73 an arm 75 carrying a cam-follower roll 76 which enters a cam-groove 77 in the face of the piercer-operating cam-disk 78 on the shaft 13. A counterweight 79 is fixed to the shaft 73 to balance the piercer-bar and associated parts and reduce vibration. The piercer 58, as best shown in Figs. 9 and 11, is of a slightly bulging conical form having a pointed extremity 80. It is further formed in one side with a clearance groove 81 for the lower curved needle 6. The piercer 58 is still further formed at the juncture of its outer surface and one side of the groove 81 with a corner 82 which spirals upwardly and outwardly from the point 80.

Figure 12:
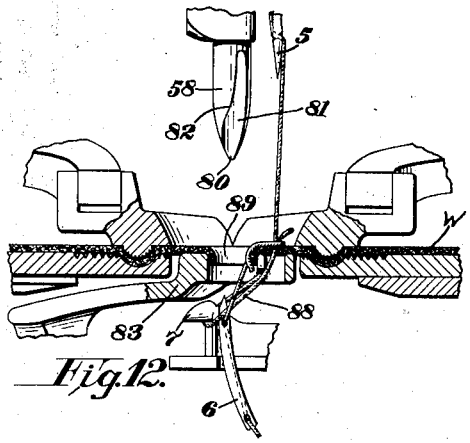

The needle-throat member 83, Fig. 8, is formed with a relatively small aperture 84 for the straight needle 5 and with a relatively large aperture 85 for the piercer 58 and curved needle 6. The apertures 84 and 85 open into one another and are separated by the tongue 86. The piercer aperture 85 is somewhat larger than the piercer 58 to provide clearance for the work a burred edge-portion of which may be bent or folded by the piercer to a certain extent into the needle-throat member, as shown in Figs. 11 and 12.

The co-action of the parts in a stitch-forming cycle is as follows: A work-piece w having been introduced to the work-clamp and the latter closed upon the work, the curved needle 6 in its first ascent punctures the work, as shown in Fig. 9. The straight needle 5 descends through the thread-loop 87 presented by the curved needle 6 as the latter retreats. Just before the point of the curved needle disappears below the work, Fig. 10, the piercer point 80, in its relatively rapid descent, engages the work closely alongside the curved needle 6 and enlarges the hole formed in the work by the curved needle, as shown in Fig. 11, without removing any portion of the work to form the hole; the groove 81 in the piercer enveloping the end-portion of the curved needle as the latter is slowly descending. In the meantime, the looper 7 has seized a thread-loop 88 from the straight needle and is carrying it to one side for presentation to curved needle. From the position shown in Fig. 11, the piercer and straight needle rise rapidly and substantially at the same speed while the curved needle descends more slowly and then rises through the needle-loop 88, Fig. 12. The curved needle, continuing its ascent, rises through the enlarged hole 89 formed in the work by the piercer and the stitch-forming cycle of operations is repeated until the eyelet is completely stitched.

The piercer, in its repeated descents into the partially stitched eyelet, has a desirable shaping action on the edge-portion of the eyelet in advance of the stitching. The leading spiral corner 82, in particular, acts to repeatedly engage and wipe downwardly and forwardly over the edge of the eyelet in advance of the sewing, thus progressively and repeatedly spreading and downwardly rounding or folding the material around the hole and condensing the edge-portion in advance of the sewing which binds the condensed and folded edge-portion of the material about the hole and forms a very strong and shapely eyelet.

In the modification of the invention shown in Figs. 16 to 19, inclusive, the piercer 58' is rigidly mounted on the needle-bar 8 alongside the needle 5, so as to have no differential vertical motion relative to the latter. This necessitates a slight lengthening of the shank of the piercer and a deepening and lengthening of the clearance groove 81' for the curved needle 6. The piercer 58' has a point 80' and an upwardly spiraling leading corner 82' structurally and functionally similar to the corresponding parts of the previously described piercer 58. The co-action of the piercer 58' with the curved needle 6 is shown in Fig. 18 in which the piercer 58' and straight needles 5 are at the ends of their respective down-strokes.

In the finished eyelet shown in Figs. 20 and 21, it will be observed that the material adjacent the hole is condensed and folded under at 89, giving a raised or embossed edge effect at 89', and is bound down by the overedge loops 87; the needle-thread loops 88 being more securely anchored in the material than would be the case were the eyelet hole punched or cut and the cut-out portion of the material removed.

The invention is not to be understood as limited to the details of construction and relative arrangements of parts of the modifications shown and described, as various other modifications may obviously be made by those skilled in the art within the spirit and scope of the invention.

Having thus set forth the nature of the invention, what I claim herein is:—

1. In a sewing machine, the combination with overedge stitch-forming mechanism including a reciprocatory needle and an overedge implement cooperating therewith, a work-clamp, means for relatively rotating the stitch-forming mechanism and work-clamp to place the overedge stitches radially around an eyelet, and a reciprocatory non-cutting work-piercer mounted alongside said needle in position to wedge open an eyelet hole in the work for passage of said overedge implement, and means for reciprocating said piercer during the sewing operation.

2. In a sewing machine, the combination with stitch-forming mechanism including an upper reciprocatory straight needle, a lower curved needle, and a looper, of a needle-throat member apertured to receive said needles on their respective thrusts through the work, a reciprocatory eyelet-hole-forming piercer mounted alongside said upper straight needle, and means for repeatedly projecting said piercer through the work and into said apertured needle-throat member during the eyelet sewing cycle of operation.

3. In an eyelet sewing machine, the combination with stitch-forming mechanism including an upper reciprocatory straight needle, a lower curved needle, and means for turning said needles about a vertical axis in sewing around an eyelet, of a work-clamp and a reciprocatory work-piercer mounted alongside said straight needle to turn with the latter about said vertical axis during the sewing.

4. In a sewing machine, the combination with overedge stitch-forming mechanism including a reciprocatory needle and an overedge implement cooperating therewith, a work-clamp, means for relatively rotating the stitch-forming mechanism and work-clamp to place the overedge stitches radially around an eyelet, and a reciprocatory work-piercer mounted alongside said needle in position to form a hole in the work for passage of said overedge implement, said work-piercer being formed in one side with a clearance groove for said overedge implement.

5. In an eyelet sewing machine, the combination with stitch-forming mechanism including an upper reciprocatory straight needle, a lower curved needle, and means for turning said needles about a vertical axis in sewing around an eyelet, of a work-clamp, a reciprocatory work-piercer mounted alongside said straight needle to turn with the latter about said vertical axis during the sewing, and a needle-throat member apertured to receive said work-piercer.

6. In an eyelet sewing machine, the combination with stitch-forming mechanism including an upper reciprocatory straight needle, a lower curved needle, and means for turning said needles about a vertical axis in sewing around an eyelet, of a work-clamp, a reciprocatory work-piercer mounted alongside said straight needle to turn with the latter about said vertical axis during the sewing, and a needle-throat member apertured to receive said work-piercer, said piercer having a conical point formed in one side with a clearance groove for said curved needle.

7. In an eyelet sewing machine, the combination with stitch-forming mechanism including an upper reciprocatory straight needle, a lower curved needle, and means for turning said needles about a vertical axis in sewing around an eyelet, of a work-clamp, a reciprocatory work-piercer mounted alongside said straight needle to turn with the latter about said vertical axis during the sewing, and a needle-throat member apertured to receive said work-piercer, said piercer being formed in one side with a clearance groove for said curved needle, the walls of said groove being shaped to provide a spiral corner at the juncture of one side wall of said groove and the outer surface of said piercer.

8. In a sewing machine, the combination with a longitudinally grooved needle-bar, of a piercer-bar let into the groove in said needle-bar, an eye-pointed needle carried by said needle-bar, a work-piercer carried by said piercer-bar, means for differentially reciprocating said bars, means cooperating with said needle to form stitches over the edge of a hole formed in the work by said piercer, a work-clamp, and means for relatively turning said work-clamp and the stitch-forming means about an axis substantially coincident with the path of reciprocation of said work-piercer.

9. In a sewing machine, the combination with stitch-forming mechanism including an upper reciprocatory straight needle, a lower curved needle, and a looper, of a reciprocatory work-piercer spaced from and fixed relative to said straight needle, said work-piercer being formed in one side with a clearance groove for said curved needle, a work-clamp, and means for relatively turning said stitch-forming mechanism and work-clamp about an axis substantially coincident with the path of reciprocation of said work-piercer.

10. In a sewing machine, a reciprocatory straight needle and a reciprocatory non-cutting work-piercer mounted at the same side of the work in spaced relation to one-another, means for repeatedly reciprocating said work-piercer while said needle is active, a looper and a curved needle mounted at the other side of the work and cooperating with said straight needle to form stitches over the edge of an eyelet hole formed in the work by said work-piercer, a work-clamp, and means for relatively turning the stitch-forming devices and work-clamp to place the overedge stitches radially of the eyelet hole in the work.

11. In a sewing machine, a reciprocatory needle-bar, a straight needle and a work-piercer fixedly carried by said needle-bar in spaced relation to one-another, a looper and a curved needle cooperating with said straight needle to form stitches over the edge of an eyelet hole formed in the work by said piercer, a work-clamp, and means for relatively turning the stitch-forming devices and work-clamp to place the overedge stitches radially of the eyelet hole in the work.

12. In a sewing machine, the combination with overedge stitch-forming mechanism including an upper straight needle, a lower curved needle and a looper, a work-clamp, and means for relatively rotating the stitch-forming mechanism and work-clamp about an axis normal to the plane of the work, of a work-piercing implement, and means for reciprocating said implement along said axis during the sewing operation.

13. In a sewing machine, the combination with overedge stitch-forming mechanism including an upper straight needle, a lower curved needle and a looper, a work-clamp, and means for relatively rotating the stitch-forming mechanism and work-clamp about an axis normal to the plane of the work, of a substantially cylindrical non-cutting work-piercing implement the axis of which is substantially coincident with the axis of relative rotation of the stitch-forming mechanism and work-clamp, and means for reciprocating said implement along said axis of relative rotation during the sewing operation.

14. In a sewing machine, the combination with overedge stitch-forming mechanism including an upper straight needle, a lower curved needle and a looper, a work-clamp, and means for relatively rotating the stitch-forming mechanism and work-clamp about an axis normal to the plane of the work, of a conically pointed cylindrical work-piercing implement having a lateral groove to receive said curved needle, and means for reciprocating said implement along said axis during the sewing operation.

15. In a sewing machine, the combination with overedge stitch-forming mechanism including an upper depth-stitch needle and a lower overedge needle, a work-clamp, and means for rotating the stitch-forming mechanism about an axis normal to the plane of the work, of a wedge-pointed non-cutting work-piercing implement mounted to rotate with the stitch-forming mechanism about said axis and positioned to wedge open a hole in the material for entry by the lower overedge needle, and means for projecting said work-piercing implement into the work and withdrawing it therefrom, said work-piercing implement having a clearance groove for the lower overedge needle.

ALFRED R. WOOD.